US011683342B2

(12) United States Patent
Callahan et al.

(10) Patent No.: US 11,683,342 B2
(45) Date of Patent: *Jun. 20, 2023

(54) DETECTING AND ATTRIBUTING UNDESIRABLE AUTOMATIC REDIRECTS

(71) Applicant: Ad Lightning, Inc., Seattle, WA (US)

(72) Inventors: Drake Callahan, Seattle, WA (US); Doug Britsch, Seattle, WA (US)

(73) Assignee: Ad Lightning Inc., Seattle, WA (US)

( * ) Notice: Subject to any disclaimer, the term of this patent is extended or adjusted under 35 U.S.C. 154(b) by 88 days.

This patent is subject to a terminal disclaimer.

(21) Appl. No.: 16/949,400

(22) Filed: Oct. 28, 2020

(65) Prior Publication Data

US 2021/0044619 A1   Feb. 11, 2021

Related U.S. Application Data

(63) Continuation of application No. 15/976,833, filed on May 10, 2018, now Pat. No. 10,826,936.

(60) Provisional application No. 62/504,403, filed on May 10, 2017.

(51) Int. Cl.
*H04L 9/40* (2022.01)
*G06F 16/955* (2019.01)
*G06F 21/56* (2013.01)
*H04L 67/563* (2022.01)

(52) U.S. Cl.
CPC ...... *H04L 63/1483* (2013.01); *G06F 16/9566* (2019.01); *G06F 21/566* (2013.01); *H04L 67/563* (2022.05)

(58) Field of Classification Search
CPC ............... G06F 21/566; G06F 16/9566; H04L 63/1483; H04L 67/563

USPC ............................................................ 726/22
See application file for complete search history.

(56) References Cited

U.S. PATENT DOCUMENTS

| 9,003,423 | B1 | 4/2015 | Rodriguez Valadez et al. |
| 9,009,821 | B2* | 4/2015 | Podjarny ............. H04L 63/1441 726/22 |
| 9,218,267 | B1 | 12/2015 | Keller |
| 9,843,447 | B1* | 12/2017 | Bishop ...................... H04L 9/14 |
| 10,482,239 | B1* | 11/2019 | Liu ........................ G06F 21/563 |
| 10,826,936 | B2 | 11/2020 | Callahan et al. |
| 11,132,717 | B2 | 9/2021 | Kosai et al. |
| 2008/0091524 | A1 | 4/2008 | Yan et al. |
| 2009/0099920 | A1 | 4/2009 | Aharoni et al. |
| 2009/0307056 | A1 | 12/2009 | Park et al. |
| 2011/0213678 | A1 | 9/2011 | Chorney |

(Continued)

FOREIGN PATENT DOCUMENTS

WO    2021102470    5/2021

OTHER PUBLICATIONS

Su et al., "De-anonymizing Web Browsing Data with Social Networks", Proceedings of the 26th International Conference on www. pp. 12610-1269. (Year: 2017).

(Continued)

*Primary Examiner* — Benjamin A Kaplan
(74) *Attorney, Agent, or Firm* — Fortem IP LLP; Matthew Lincicum

(57) ABSTRACT

Techniques are described for detecting and attributing automatic unauthorized redirects originating from executable code contained within an advertisement hosted within a web page or application displayed on an end user's mobile or desktop computing devices.

16 Claims, 3 Drawing Sheets

(56) References Cited

U.S. PATENT DOCUMENTS

| | | | |
|---|---|---|---|
| 2012/0158509 | A1 | 6/2012 | Zivkovic et al. |
| 2013/0124300 | A1 | 5/2013 | Hopwood |
| 2015/0082426 | A1 | 3/2015 | Palan et al. |
| 2015/0326608 | A1 | 11/2015 | Shabtai et al. |
| 2016/0063568 | A1 | 3/2016 | Brill et al. |
| 2016/0261623 | A1* | 9/2016 | McClintock ........ H04L 63/1425 |
| 2017/0004221 | A1 | 1/2017 | Olsen |
| 2017/0054739 | A1 | 2/2017 | Wardman et al. |
| 2017/0068964 | A1 | 3/2017 | Gevka et al. |
| 2017/0091351 | A1 | 3/2017 | Namer et al. |
| 2017/0149817 | A1* | 5/2017 | Sharifi Mehr ...... H04L 63/1483 |
| 2017/0243238 | A1 | 8/2017 | Kosai et al. |
| 2018/0012256 | A1 | 1/2018 | Napchi et al. |
| 2021/0383435 | A1 | 12/2021 | Kosai et al. |

OTHER PUBLICATIONS

AutoBLG: Automatic URL Blacklist Generator Using Search Space Expansion and Filters 20th IEEE Symposium on Computers and Communication (ISCC) pp. 625-631 (Year: 2015).

How Retailers Can Optimize Campaigns With Dynamic Search Ads https://www.cpcstrategy.com/blog/2015/08/dynamic-search-ads/ (Year: 2015).

International Search Report and Written Opinion dated Feb. 9, 2021, International Application No. PCT/US20/70809, 15 pages.

* cited by examiner

DETECTING AND ATTRIBUTING UNDESIRABLE AUTOMATIC REDIRECTS

CROSS-REFERENCE TO RELATED APPLICATION(S)

This patent application is a continuation of U.S. patent application Ser. No. 15/976,833, filed May 10, 2018, which claims the benefit of priority to U.S. Provisional Patent Application No. 62/504,403 filed on May 10, 2017, each of which is incorporated by reference herein in its entirety.

TECHNICAL FIELD

This disclosure pertains to detecting malicious behavior by third party advertisers hosted within web sites and applications and displayed to end users on mobile and desktop computing devices.

SUMMARY WITH BACKGROUND INFORMATION

A common method for content creators and publishers (generally referred to as "publishers") to monetize their creations is to host paid advertisements on their web sites and within their applications. In doing so, publishers commonly allow content and executable code from third party advertisers to be dynamically hosted within their websites. Publishers commonly contract with advertising clearinghouses and generally have surprisingly little control over what content is displayed on their site.

Unscrupulous advertisers may inject code to cause the end user's device to navigate, without end user consent or interaction, to a different website or application. These unauthorized and automated navigations are referred to herein as "redirects." While often innocuous, redirects are sometimes used with the intention of defrauding the end user, the publisher, or an advertising partner.

Redirects are also a common method for delivering various forms of malware to the end user's device. Often the end user believes the publisher's site has been compromised, or that the publisher is in some way complicit with the unscrupulous advertiser. This can negatively affect the relationship and trust between the end user and the publisher.

Publishers typically host multiple advertisements often from several advertising networks on a single page or application, making identification of the specific advertisement responsible for the malicious redirect difficult. Unscrupulous advertisers regularly try to hide their malicious code from detection by using various techniques including various encoding techniques, multiple scripts working together, and hiding content in other files, such as images or CSS, that are used by the advertisement to hide the commands from easy inspection to identify the content being delivered as malicious. Making things more difficult, the unscrupulous advertiser will often use various methods to detect specific devices, operating systems, and web browser versions as well as device capabilities such as geographic location, or accelerometers in mobile devices. They may use this information to only send malicious code to the end user when a specific combination of factors is present. This makes pre-inspection of the content by advertising networks and content publishers exceedingly difficult.

A superior technique to detect complex malware has eluded those skilled in the art, until now.

DETAILED DESCRIPTION

Generally described, the disclosure is directed at techniques for detecting automatic unauthorized redirects originating from executable code contained within an advertisement hosted within a web page or application displayed on an end user's mobile or desktop computing device. In addition, the techniques enable attribution of the unauthorized redirect to the originator or source of the responsible executable code.

The disclosure is structured as follows. It begins with a discussion of an illustrative operating environment in which embodiments may be implemented. In the most preferred embodiment, the system and techniques described herein are implemented in one or more computing device(s). Such computing devices may be either mobile computing devices, or workstation computing devices, or some combination. Next is a discussion of specific features of a preferred embodiment, with certain alternatives, in the context of software components executing on one or more instances of the illustrative computing device.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be used, and other changes may be made, without departing from the spirit and scope of the subject matter presented herein. It will be readily understood that aspects of the disclosure, as generally described herein, and illustrated in the figures, can be arranged, substituted, combined, separated, and designed in a wide variety of different configurations, all of which are explicitly contemplated herein.

Illustrative Operating Environment

Figure 1:
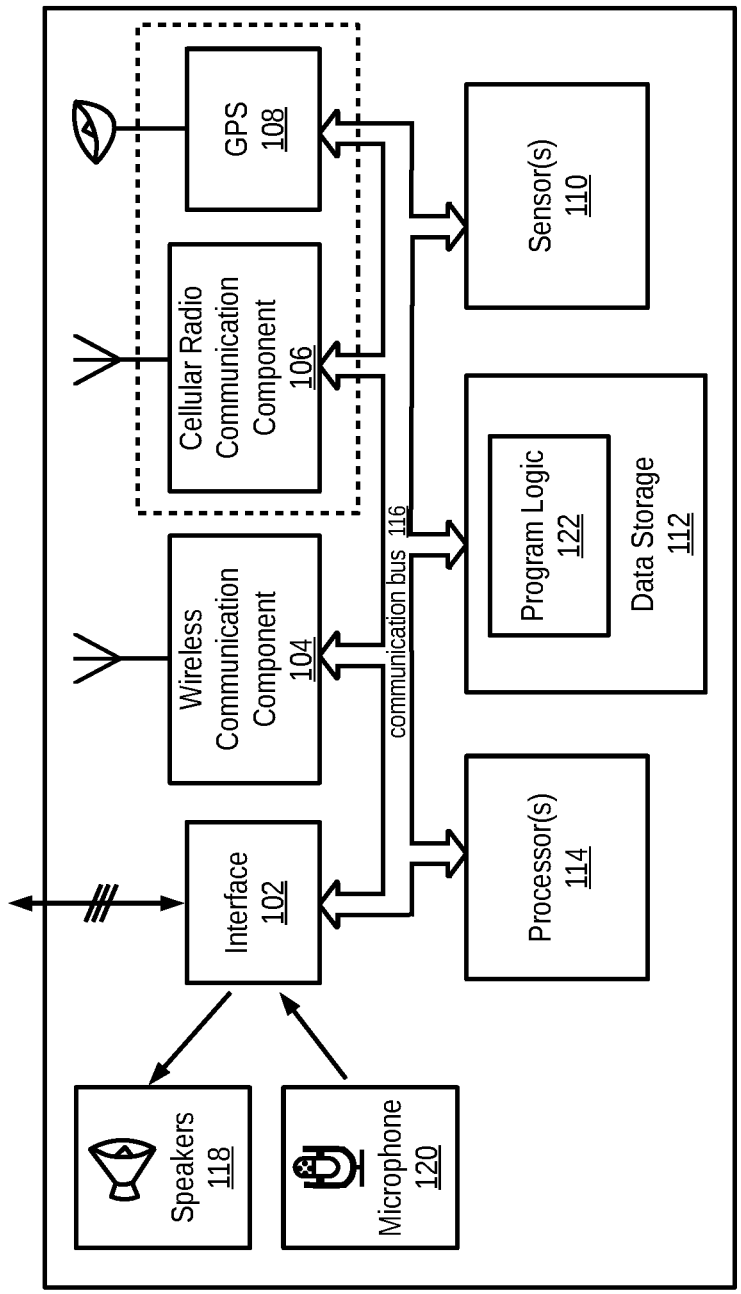
FIG. 1 is an illustrative computing device in which embodiments may be implemented.

Turning now to the figures, FIG. 1 illustrates an example computing device 100. In some examples, components illustrated in FIG. 1 may be distributed across multiple computing devices. However, for the sake of example, the components are shown and described as part of one example computing device 100. The computing device 100 may be or include a mobile device (such as a mobile phone), desktop computer, laptop computer, email/messaging device, tablet computer, or similar device that may be configured to perform the functions described herein. Generally, the computing device 100 may be any type of computing device or transmitter that is configured to transmit data or receive data in accordance with methods and functions described herein.

The computing device 100 may include an interface 102, a wireless communication component 104, a cellular radio communication component 106, a global positioning system (GPS) receiver 108, sensor(s) 110, data storage 112, and processor(s) 114. Components illustrated in FIG. 1 may be linked together by a communication link 116. The computing device 100 may also include hardware to enable communication within the computing device 100 and between the computing device 100 and other computing devices (not shown), such as a server entity. The hardware may include transmitters, receivers, and antennas, for example.

The interface 102 may be configured to allow the computing device 100 to communicate with other computing devices (not shown), such as a server. Thus, the interface 102 may be configured to receive input data from one or more computing devices, and may also be configured to send output data to the one or more computing devices. The interface 102 may be configured to function according to a wired or wireless communication protocol. In some examples, the interface 102 may include buttons, a keyboard, a touchscreen, speaker(s) 118, microphone(s) 120, and/or any other elements for receiving inputs, as well as one or more displays, and/or any other elements for communicating outputs.

The wireless communication component 104 may be a communication interface that is configured to facilitate wireless data communication for the computing device 100 according to one or more wireless communication standards. For example, the wireless communication component 104 may include a Wi-Fi communication component that is configured to facilitate wireless data communication according to one or more IEEE 802.11 standards. As another example, the wireless communication component 104 may include a Bluetooth communication component that is configured to facilitate wireless data communication according to one or more Bluetooth standards. Other examples are also possible.

The cellular radio communication component 106 may be a communication interface that is configured to facilitate wireless communication (voice and/or data) with a cellular wireless base station to provide mobile connectivity to a network. The cellular radio communication component 106 may be configured to connect to a base station of a cell in which the computing device 100 is located, for example.

The GPS receiver 108 may be configured to estimate a location of the computing device 100 by precisely timing signals received from Global Positioning System (GPS) satellites.

The sensor(s) 110 may include one or more sensors, or may represent one or more sensors included within the computing device 100. Example sensors include an accelerometer, gyroscope, pedometer, light sensor, microphone, camera(s), infrared flash, barometer, magnetometer, Wi-Fi, near field communication (NFC), Bluetooth, projector, depth sensor, temperature sensor, or other location and/or context-aware sensors.

The data storage 112 (memory) may store program logic 122 that can be accessed and executed by the processor(s) 114. The data storage 112 may also store data collected by the sensor(s) 110, or data collected by any of the wireless communication component 104, the cellular radio communication component 106, and the GPS receiver 108.

The processor(s) 114 may be configured to receive data collected by any of sensor(s) 110 and perform any number of functions based on the data. As an example, the processor(s) 114 may be configured to determine one or more geographical location estimates of the computing device 100 using one or more location-determination components, such as the wireless communication component 104, the cellular radio communication component 106, or the GPS receiver 108. The processor(s) 114 may use a location-determination algorithm to determine a location of the computing device 100 based on a presence and/or location of one or more known wireless access points within a wireless range of the computing device 100. In one example, the wireless location component 104 may determine the identity of one or more wireless access points (e.g., a MAC address) and measure an intensity of signals received (e.g., received signal strength indication) from each of the one or more wireless access points. The received signal strength indication (RSSI) from each unique wireless access point may be used to determine a distance from each wireless access point. The distances may then be compared to a database that stores information regarding where each unique wireless access point is located. Based on the distance from each wireless access point, and the known location of each of the wireless access points, a location estimate of the computing device 100 may be determined.

In another instance, the processor(s) 114 may use a location-determination algorithm to determine a location of the computing device 100 based on nearby cellular base stations. For example, the cellular radio communication component 106 may be configured to identify a cell from which the computing device 100 is receiving, or last received, signal from a cellular network. The cellular radio communication component 106 may also be configured to measure a round trip time (RTT) to a base station providing the signal, and combine this information with the identified cell to determine a location estimate. In another example, the cellular communication component 106 may be configured to use observed time difference of arrival (OTDOA) from three or more base stations to estimate the location of the computing device 100.

In some implementations, the computing device 100 may include a device platform (not shown), which may be configured as a multi-layered Linux platform. The device platform may include different applications and an application framework, as well as various kernels, libraries, and runtime entities. In other examples, other formats or operating systems may operate the computing device 100 as well.

The communication link 116 is illustrated as a wired connection; however, wireless connections may also be used. For example, the communication link 116 may be a wired serial bus such as a universal serial bus or a parallel bus, or a wireless connection using, e.g., short-range wireless radio technology, or communication protocols described in IEEE 802.11 (including any IEEE 802.11 revisions), among other possibilities.

The computing device 100 may include more or fewer components. Further, example methods described herein may be performed individually by components of the computing device 100, or in combination by one or all of the components of the computing device 100.

Preferred Embodiments

Figure 2:
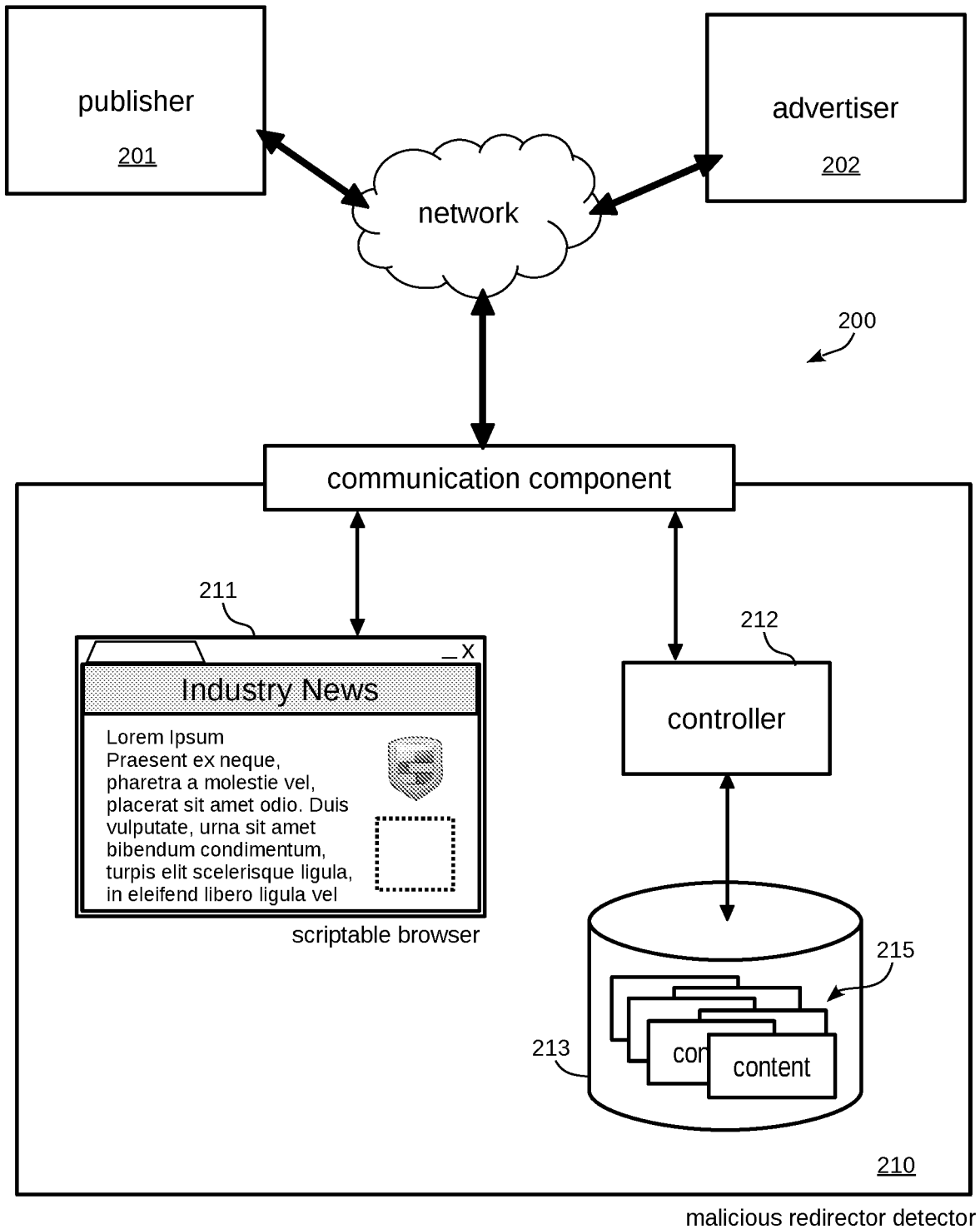
FIG. 2 is a conceptual block diagram generally illustrating components of a system for analyzing a web page for malicious redirects.
Figure 3:
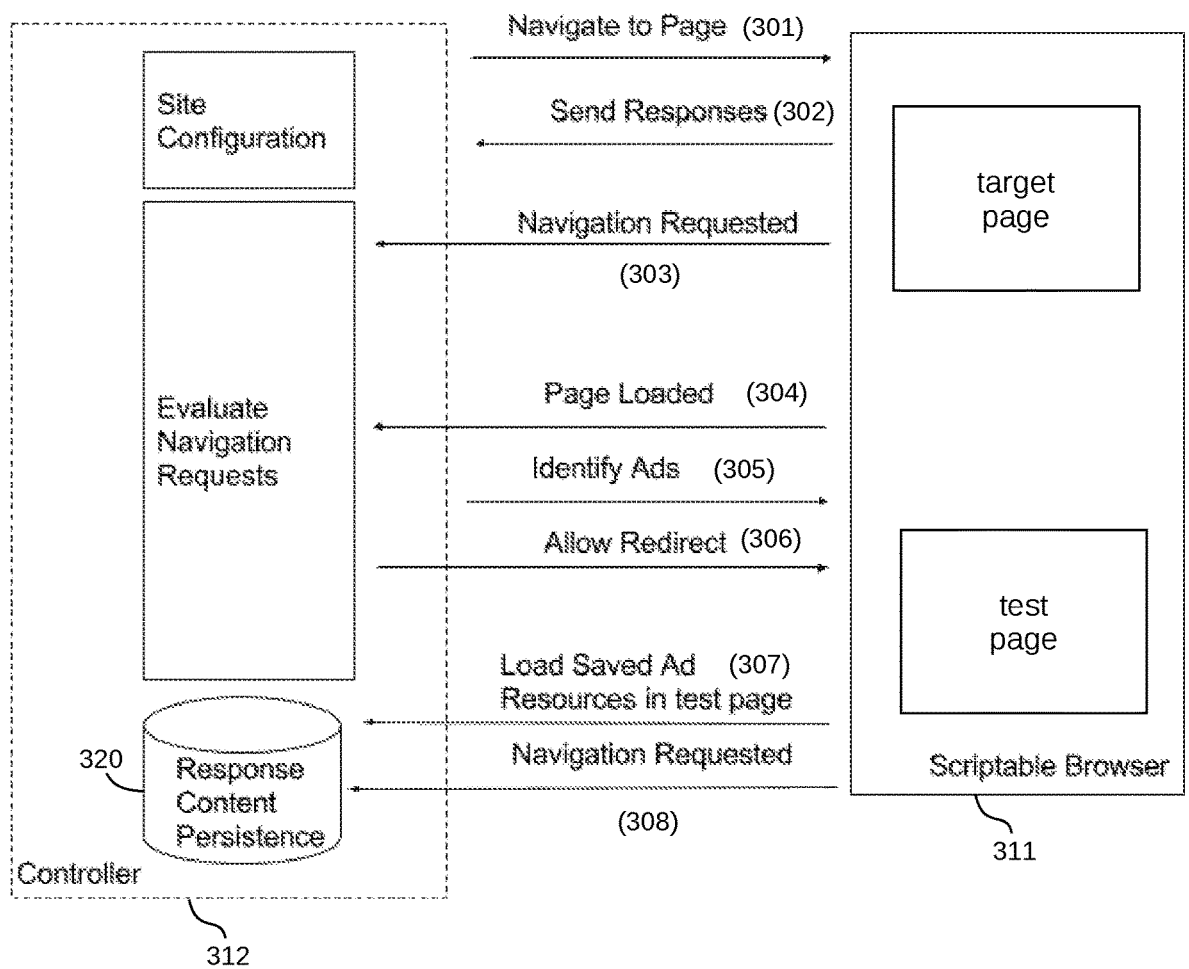
FIG. 3 is a functional flow diagram generally illustrating steps performed by a system for analyzing a web page for malicious redirects.

Referring now to FIGS. 2 and 3, a most preferred embodiment will be described in the context of a set of software components, or firmware components, or any combination of the two. The preferred embodiment will be described with reference to the implementation of a process for analyzing a web page to detect malicious redirects.

Referring first to FIG. 2, embodiments are implemented within a network environment 200 in which operate at least one publisher 201 and at least one advertiser 202. It will be appreciated that in actuality many publishers and many advertisers will exist and provide various services. In accordance with this disclosure, the publisher 201 represents any content provider that publishes information on at least one web page. The advertiser 202 represents an entity that is configured to deliver ads that may be embedded in the web content of other online service providers. The publisher 201 engages the advertiser 202 to display ads in conjunction with the publisher's content.

In addition, a malicious redirect detector 210 is implemented and specially configured to identify complex malicious code disguised within or as online ads. Specifically, the malicious redirect detector 210 is specially configured to identify the existence of a malicious redirect and attribute that malicious redirect to its source or origin.

In a preferred embodiment, the malicious redirect detector 210 includes an executable application capable of retrieving web pages from remote sites, rendering HTML, running javascript (or other scripting languages), and accepting external commands. This executable application is referred to as a "scriptable browser" 211. In this embodiment, the scriptable browser 211 may be configured to report different browser identifiers as well as browser capabilities when it requests a target web page.

The scriptable browser 211 receives and responds to external commands and delivers responses to one or more other executable applications. The other executable application(s) maintain configuration information for content to be scanned as well as the execution state. The one or more other executable applications will be collectively referred to herein as a "controller" 212.

The malicious redirect detector 210 further includes a data store 213 in which may be stored content 215 that is returned to the controller 212 from the scriptable browser 211. The content 215 represents resources.

Configuring the Controller and Scriptable Browser

To prepare the malicious redirect detector 210 for operation, the controller 212 may be configured with a specific Universal Resource Locator (URL) that identifies a content web page to be evaluated (the "target page"). For example, the target page may be a web page hosted by the publisher 201 and which delivers an ad provided by the advertiser 202.

In preparation for evaluating retrieved content, the controller 212 is configured to transmit a command to the scriptable browser 211 instructing it to notify the controller 212 of, and block, any navigation until the controller 212 explicitly allows or cancels the navigation. The controller 212 also instructs the scriptable browser 211 to send content which it downloads as part of the target page to the controller 212. The controller 212 may also send a command to the scriptable browser 211 requesting that the controller 212 be notified when the target page is loaded.

The operation of the malicious redirect detector 210 will now be described with reference to the conceptual flow diagram illustrated in FIG. 3. Turning now to FIG. 3, the messages and information exchanged between the controller 312 and the scriptable browser 311 are illustrated in a temporal manner.

Loading the Configured Content

At step 301, the controller 312 sends a command to the scriptable browser 311 to navigate to the configured URL, which points to the target page.

The scriptable browser 311 loads static and dynamic content from the target page. The static and dynamic content of the target page may include one or more advertisements in the form of third-party scripts.

The controller 312 is notified by the scriptable browser 311 once the target page is loaded. At that point, the controller 312 requests the content of the target page from the scriptable browser 311. Alternatively, the scriptable browser 311 could be configured to deliver the content of the target page to the controller 312 as it is being received by the scriptable browser 311. Either way, once received, the controller 312 persists the content in a local data store 320.

Isolating Ad Content

Once received, the controller 312 inspects the target page content for configured patterns matching known signatures of advertisement slots. In other words, the controller 312 analyzes the target page content to identify particular content that either appears to be advertising content, or is known to be advertising content based on information provided by the publisher. The controller 312 may then identify programmatic requests initiated by executable code or HTML markup in the identified advertisement slots.

Any responses to those requests may also be persisted in the data store 320 for later evaluation. In addition, identifying information about each advertisement, and any resources associated with those advertisements on the target page, may be persisted by the controller 312 in the data store 320.

Detecting Navigation

At step 303, any requests for navigation from within the target page are sent to the controller 312 for evaluation. As noted above, each navigation request is blocked until explicitly allowed by the controller 312. The controller 312 inspects the navigation request by determining if the request is to navigate the main page or a subordinate frame within the target page.

Well behaved advertisements (i.e., non-malicious advertisements) are typically allowed to navigate within their own area of the target page. Accordingly, if the request is to navigate within a subordinate frame, the request may be immediately allowed to proceed. However, if the navigation request calls for a redirect away from the main frame of the target page, the navigation request is inspected to determine if it is an "allowed redirect." For the purpose of this discussion, an "allowed redirect" is one that is presumed safe based on, for example, empirical information or analysis. Embodiments use various criteria to determine whether a redirect is an allowed redirect. For example, allowed redirects include redirects initiated by executable code or markup in the main site which may redirect from a desktop version to a mobile version of the same site. In another example, a redirect that navigates the target page to a site geographically closer to the end user (e.g., from example.com to example.co.uk) is presumed safe.

In addition, the hostname may be normalized to allow navigations from locations that are not significantly different from each other. For example, if a navigation attempts to redirect from an origin URL to a target URL, and those two URLs only differ in their top-level domain (as defined and assigned by Internet Corporation for Assigned Names and Numbers (ICANN), for instance .com, .co.uk, .co.in, or the like), that redirect may be considered safe. In another example, if the origin URL and the target URL differ only in the host portion (also referred to as the subdomain) of their private domain (for instance the "www" in "www.example.com"), that redirect may be considered safe. In yet another example, If the primary private domain (e.g., "example" in "www.example.com", also referred to as the second level domain), is the same in the redirect (target URL) and the configured site (origin URL), the navigation may be considered a safe or allowed redirect. In still another example, if the origin URL and the target URL have significant textual overlap, the redirect may be considered safe and allowed. In other words, two domains may be considered related if, for example, a substantial portion of one URL is contained within the other URL. For instance, if the origin URL is "example.com" and the target URL is "examplemail.com" or "exampleimages.com", then a navigation from the origin URL to the target URL may be considered safe and allowed based on the likelihood that the two URLs pertain to the same entity. These and other criteria for identifying "allowed redirects" will become apparent to those skilled in the art from the present teachings.

If the navigation is in the primary frame (e.g., the target page) for the site and the primary private domains of the origin URL and the target URL are not a sufficiently close match, the navigation is blocked or paused to allow for the complete page load and resource gathering detailed above to complete. Once the page load is complete and the resources for each ad gathered, the controller 312 allows the navigation to the different primary private domain to continue.

It will be appreciated that more than one navigation may occur before the page load is complete. For instance, if one or more advertisements include malicious code, there could be multiple, even numerous redirects before a final end page is fully loaded. Accordingly, the end page that is finally loaded, and any intermediate redirected pages, are captured and sent to the controller 312 and persisted in the data store 320.

Attributing the Source of the Redirect

Not only can it be important to determine that a malicious redirect has occurred, where that malicious redirect came from is equally important. Accordingly, embodiments of this disclosure further implement features and techniques to attribute any malicious redirects to the entity that is responsible for them. In this way, steps can be taken against those responsible for creating malicious redirects (i.e., the malicious actors) rather than merely treating the symptoms of malicious redirects.

To that end, at step 307, the controller 312 directs the scriptable browser 311 to load each of the resources it has captured from the controller's data store 320 of the content bodies actually returned in the page load. The resources for any advertisements are loaded in a test page which isolates calls, but evaluates the code in the scriptable browser 311, allowing any encoded methods to execute fully. In this way, if a malicious redirect has been obscured in some manner through complex code, that complex code is allowed to complete so that the actual malicious code can be identified. In one example, a malicious advertisement may include two or more scripts which independently do not cause a malicious redirect, thereby obscuring it. But when the two or more scripts are executed simultaneously, they may work together to cause a malicious redirect. Many other examples will become apparent from a thorough reading of the disclosure.

At step 308, the controller 312 is notified when any navigation is attempted, and it compares the requested navigation URLs captured from the test page load with the navigation request captured in the publisher's page load. If a match is found, then the specific ad that caused the malicious redirect behavior, and its identifying information, are recorded as having likely caused the redirect. If no match is found, some other approach may be taken, such as recording all advertisements loaded in the page as suspect and their resources persisted for further analysis.

The process illustrated in FIG. 3 can be repeated at varying times and with varying configurations, such as browser identity and reported hardware capabilities, and from various networks to capture a wider sample of advertisements. This approach can help ameliorate any checks that malicious advertisers may put in place to avoid detection. Information captured in this process can then be shared with publishers, ad networks or consumers.

It should be appreciated that one of the many benefits of the present disclosure is that both malicious redirects as well as the advertisements which originate them may be identified. By capturing the entire target page within the scriptable browser 311, the system may simulate an entire page-load while monitoring which particular component caused the malicious redirect. This feature is a significant improvement over any existing technologies.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method for attributing a source of an undesirable redirect, the method comprising:
   configuring a scriptable browser to retrieve a target page from a website, the target page associated with a first Uniform Resource Locator (URL) and including or identifying a plurality of dynamically generated advertisements;
   retrieving content associated with the target page to the scriptable browser;
   providing the content to a controller for analysis, the content including a programmatic instruction comprising a navigation request associated with a second URL different from the first URL;
   generating, via the controller, a test page including the content;
   inhibiting execution, at least temporarily, of the navigation request via the test page; and
   enabling execution of the navigation request via the test page only after the content of the test page is loaded; and
   analyzing, via the controller, the test page to determine which dynamically generated advertisement of the plurality of dynamically generated advertisements is associated with the navigation request.

2. The method of claim 1, further comprising analyzing, via the controller, the navigation request to determine whether the navigation request is allowable.

3. The method of claim 1, further comprising:
   executing, via the scriptable browser, the navigation request, thereby loading a redirected page;
   storing content associated with the redirected page and any intermediate redirected pages; and
   analyzing, via the controller, the stored content associated with the redirected page and any intermediate redirected pages.

4. The method of claim 1, further comprising executing, via the scriptable browser, the navigation request, thereby loading a redirected page having a third URL, and wherein analyzing, via the controller, the test page comprises comparing the third URL with the second URL.

5. A method comprising:
   receiving, at a controller, content associated with a target page of a website, the content including a plurality of advertisements and a programmatic navigation request;

generating a test page based on the received content, the test page including the programmatic navigation request;

after generating the test page, inhibiting, via the controller, execution of the programmatic navigation request;

analyzing, via the controller, the test page to identify which of the plurality of advertisements is associated with the programmatic navigation request; and enabling execution of the programmatic navigation request only after analyzing the test page.

6. The method of claim 5, further comprising analyzing, via the controller, the programmatic navigation request to determine whether the programmatic navigation request is allowable.

7. The method of claim 5, wherein analyzing the test page comprises:

executing, via the test page, the programmatic navigation request, thereby loading redirected page;

storing content associated with the redirected page and any intermediate redirected pages; and analyzing, via the controller, the stored content associated with the redirected page and any intermediate redirected pages.

8. The method of claim 5, further comprising executing, via the test page, the programmatic navigation request, thereby loading a redirected page having a redirected URL, and wherein analyzing, via the controller, the test page comprises comparing the redirected URL with one or more URLs associated with the plurality of advertisements.

9. The method of claim 5, further comprising:

executing, via the test page, the programmatic navigation request, resulting in a final page load having a first URL; and comparing the first URL of the final page load a URL associated with the programmatic navigation request.

10. The method of claim 5, further comprising:

after generating the test page, executing the programmatic navigation request, resulting in one or more intermediate redirects and a final page load; and capturing data associated with the one or more intermediate redirects and the final page load, wherein analyzing, via the controller, the test page to identify which of the plurality of advertisements is associated with the programmatic navigation request comprises analyzing the captured data to identify which advertisement of the plurality of advertisements is associated with the programmatic navigation request.

11. A tangible, non-transitory computer-readable medium storing instructions that, when executed by one or more processors of a computing device, cause the computing device to perform operations comprising:

receiving, at a controller, content associated with a target page of a website, the content including a plurality of advertisements and a programmatic navigation request;

generating a test page based on the received content, the test page including the programmatic navigation request;

after generating the test page, inhibiting, via the controller, execution of the programmatic navigation request;

analyzing, via the controller, the test page to identify which of the plurality of advertisements is associated with the programmatic navigation request; and enabling execution of the programmatic navigation request only after analyzing the test page.

12. The computer-readable medium of claim 11, wherein the operations further comprise analyzing, via the controller, the programmatic navigation request to determine whether the programmatic navigation request is allowable.

13. The computer-readable medium of claim 11, wherein analyzing the test page comprises:

executing, via the test page, the programmatic navigation request, thereby loading a redirected page;

storing content associated with the redirected page and any intermediate redirected pages; and analyzing, via the controller, the stored content associated with the redirected page and any intermediate redirected pages.

14. The computer-readable medium of claim 11, wherein the operations further comprise executing, via the test page, the programmatic navigation request, thereby loading a redirected page having a redirected URL, and wherein analyzing, via the controller, the test page comprises comparing the redirected URL with one or more URLs associated with the plurality of advertisements.

15. The computer-readable medium of claim 11, wherein the operations further comprise:

executing, via the test page, the programmatic navigation request, resulting in a final page load having a URL; and comparing the URL of the final page load to a URL associated with the navigation.

16. The computer-readable medium of claim 11, wherein the operations further comprise:

after generating the test page, executing the programmatic navigation request, resulting in one or more intermediate redirects and a final page load; and capturing data associated with the one or more intermediate redirects and the final page load, wherein analyzing, via the controller, the test page to identify which of the plurality of advertisements is associated with the programmatic navigation request comprises analyzing the captured data to identify which advertisement of the plurality of advertisements is associated with the programmatic navigation request.

* * * * *

UNITED STATES PATENT AND TRADEMARK OFFICE
CERTIFICATE OF CORRECTION

PATENT NO. : 11,683,342 B2
APPLICATION NO. : 16/949400
DATED : June 20, 2023
INVENTOR(S) : Drake Callahan et al.

Page 1 of 1

It is certified that error appears in the above-identified patent and that said Letters Patent is hereby corrected as shown below:

In the Claims

In Column 8, in Claim 1, Line 40, after "page;" delete "and".

In Column 9, in Claim 9, Line 34, delete "load a" and insert -- load to a --, therefor.

Signed and Sealed this
Twenty-fifth Day of July, 2023

Katherine Kelly Vidal
*Director of the United States Patent and Trademark Office*